(12) United States Patent
Shah et al.

(10) Patent No.: US 11,682,066 B2
(45) Date of Patent: Jun. 20, 2023

(54) HYPERLOCAL MARKETPLACE VIA SMART HOMES CONNECTED TO THE GRID

(71) Applicant: Capital One Services, LLC, McLean, VA (US)

(72) Inventors: Salik Shah, Washington, DC (US); Sophie Bermudez, Washington, DC (US)

(73) Assignee: Capital One Services, LLC, McLean, VA (US)

(*) Notice: Subject to any disclaimer, the term of this patent is extended or adjusted under 35 U.S.C. 154(b) by 44 days.

(21) Appl. No.: 17/196,405

(22) Filed: Mar. 9, 2021

(65) Prior Publication Data

US 2021/0192603 A1 Jun. 24, 2021

Related U.S. Application Data

(63) Continuation of application No. 16/774,379, filed on Jan. 28, 2020, now Pat. No. 10,963,950, which is a continuation of application No. 16/515,347, filed on Jul. 18, 2019, now Pat. No. 10,592,967.

(51) Int. Cl.
G06Q 30/00 (2023.01)
G06Q 30/0601 (2023.01)
G06Q 10/087 (2023.01)

(52) U.S. Cl.
CPC ....... G06Q 30/0635 (2013.01); G06Q 10/087 (2013.01)

(58) Field of Classification Search
CPC .................. G06Q 30/0635; G06Q 10/087
See application file for complete search history.

(56) References Cited

U.S. PATENT DOCUMENTS

| | | | | |
|---|---|---|---|---|
| 8,015,081 B1* | 9/2011 | Franco | ............... | G06Q 30/0641 705/28 |
| 2014/0236753 A1* | 8/2014 | Abhyanker | ............. | H04L 51/52 705/28 |
| 2015/0302510 A1* | 10/2015 | Godsey | ............... | G06Q 10/087 705/26.81 |
| 2015/0312348 A1* | 10/2015 | Lustgarten | ............. | H04L 67/12 705/14.66 |
| 2017/0109687 A1* | 4/2017 | Kamadolli | ......... | G06Q 30/0201 |
| 2018/0129998 A1* | 5/2018 | Frazier | ................ | G06Q 10/087 |

OTHER PUBLICATIONS

Xu, D. W., Yang, L. P., & Jiang, L. (2014). Goods inventory system based on RFID and android platform. Applied Mechanics and Materials, 687-691, 4046-4049. doi:http://dx.doi.org/10.4028/www.scientific.net/AMM.687-691.4046.*

* cited by examiner

*Primary Examiner* — Kathleen Palavecino
(74) *Attorney, Agent, or Firm* — KDW Firm PLLC

(57) ABSTRACT

Various embodiments are directed to a system for automatically and dynamically facilitating various transactions via a hyperlocal marketplace. A smart home system, for example, may track all perishable items within the home. Any items expected to have a surplus may be offered for sale to other homes in the hyperlocal marketplace. Any items expected to have a shortage may be identified and made known to the other homes in the hyperlocal marketplace. Bids may be made on the shortage items that may be offered for sale by the marketplace.

20 Claims, 8 Drawing Sheets

| ITEMS | QTY | LAST DATE OF PURCHASE | AVG USAGE RATE | NEXT EXPECT DATE OF PURCHASE | EXPIRATION DATE | SURPLUS OR SHORTAGE |
|---|---|---|---|---|---|---|
| BREAD 202 | 48 slices | 1/1/2019 | 4/day | 1/15/2019 | 1/21/2019 | SHORTAGE (8 slices) |
| EGGS 204 | 36 | 1/3/2019 | 2/day | 1/15/2019 | 1/10/2019 | SURPLUS (12 eggs) |
| MILK 206 | 2 gal. | 12/23/2018 | 0.2 gal./day | 1/15/2019 | 1/10/2019 | SHORTAGE (2.6 gal.) |
| FLOUR 208 | 5 lbs. | 1/9/2019 | 0.075 lb./day | 2/9/2019 | 4/9/2019 | SURPLUS (2.75 lbs.) |
| SUGAR 210 | 4 lbs. | 1/9/2019 | 0.075 lb./day | 2/9/2019 | 4/9/2019 | SURPLUS (1.75 lbs.) |
| BERRIES 212 | 12 oz. | 1/9/2019 | 2 oz./day | 1/15/2019 | 1/19/2019 | N/A |
| SALMON 214 | 2 lbs. | 1/9/2019 | 0.000 lb./day | 1/15/2019 | 1/13/2019 | SURPLUS (2 lbs.) |
| CHICKEN 216 | 4 lbs. | 1/9/2019 | 1 lb./day | 1/15/2019 | 1/16/2019 | SHORTAGE (2 lbs.) |
| CARROTS 218 | 2 lbs. | 1/9/2019 | 0.25 lb./day | 1/15/2019 | 1/20/2019 | SURPLUS (0.5 lb.) |
| IBUPROFEN 220 | 20 ct. | 1/9/2019 | 2/day | 1/15/2019 | 1/9/2020 | SURPLUS (8 cts.) |

SHORTAGE NOTIFICATION 302
- BREAD (8 SLICES)
- MILK (2.6 GALLONS)
- CHICKEN (2 POUNDS)

SURPLUS NOTIFICATION 304
- EGGS (12 EGGS)
- FLOUR (2.75 POUNDS)
- SUGAR (1.75 POUNDS)
- SALMON (2 POUNDS)
- CARROTS (0.5 POUND)
- IBUPROFEN (8 COUNTS)

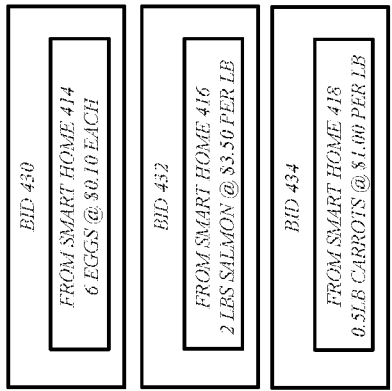
FIG. 4B
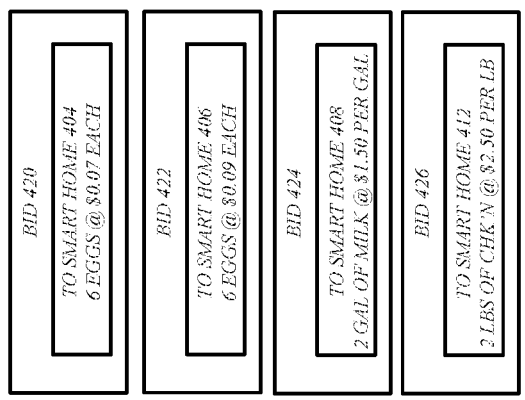
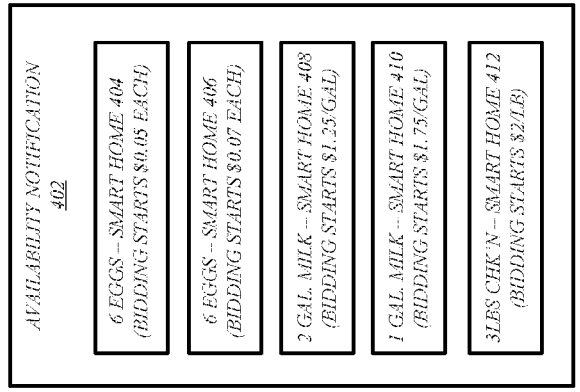
FIG. 4A

US 11,682,066 B2

HYPERLOCAL MARKETPLACE VIA SMART HOMES CONNECTED TO THE GRID

RELATED APPLICATION

This application is a continuation of U.S. patent application Ser. No. 16/774,379, filed on Jan. 28, 2020, which is a continuation of U.S. patent application Ser. No. 16/515,347, now U.S. Pat. No. 10,592,967, filed on Jul. 18, 2019, both titled "HYPERLOCAL MARTKETPLACE VIA SMART HOMES CONNECTED TO THE GRID". The contents of the aforementioned applications are incorporated herein by reference in their entirety.

BACKGROUND

Food waste by grocery stores is a huge problem and negatively impacts not only the amount of garbage thrown into landfills, but also negatively impacts the environment. Efforts have been undertaken by the grocery stores to reduce waste, such as donating perishable items, recycling waste, etc.

Waste, however, related to purchased items on the consumer end, such as perishable goods, is a common occurrence. For example, people may not consume all of their groceries, e.g., milk, bread, fruits, vegetables, protein, etc., which could result in unnecessary waste and spending. Accordingly, there is a need for a platform that allows the sharing of items in a given household with other households located within a predefined vicinity by broadcasting to those households that the items are available for consumption.

SUMMARY

Various embodiments are generally directed to a system for automatically and dynamically facilitating various transactions via a hyperlocal marketplace. A smart home system, for example, may track all items (perishable or otherwise) within the home. Any items expected to have a surplus may be offered for sale to other homes in the hyperlocal marketplace. Any items expected to have a shortage may be identified and made known to the other homes in the hyperlocal marketplace. Thereafter, bids may be made on the shortage items that may be offered for sale (at discount) by the marketplace. Accordingly, overall waste within the hyperlocal community can be reduced.

BRIEF DESCRIPTION OF THE DRAWINGS

FIG. 2 illustrates an example inventory chart in accordance with one or more embodiments.

FIG. 3 illustrate example notifications in accordance with one or more embodiments.

FIGS. 4A-B illustrate example smart home transactions in accordance with one or more embodiments.

DETAILED DESCRIPTION

Figure 1:
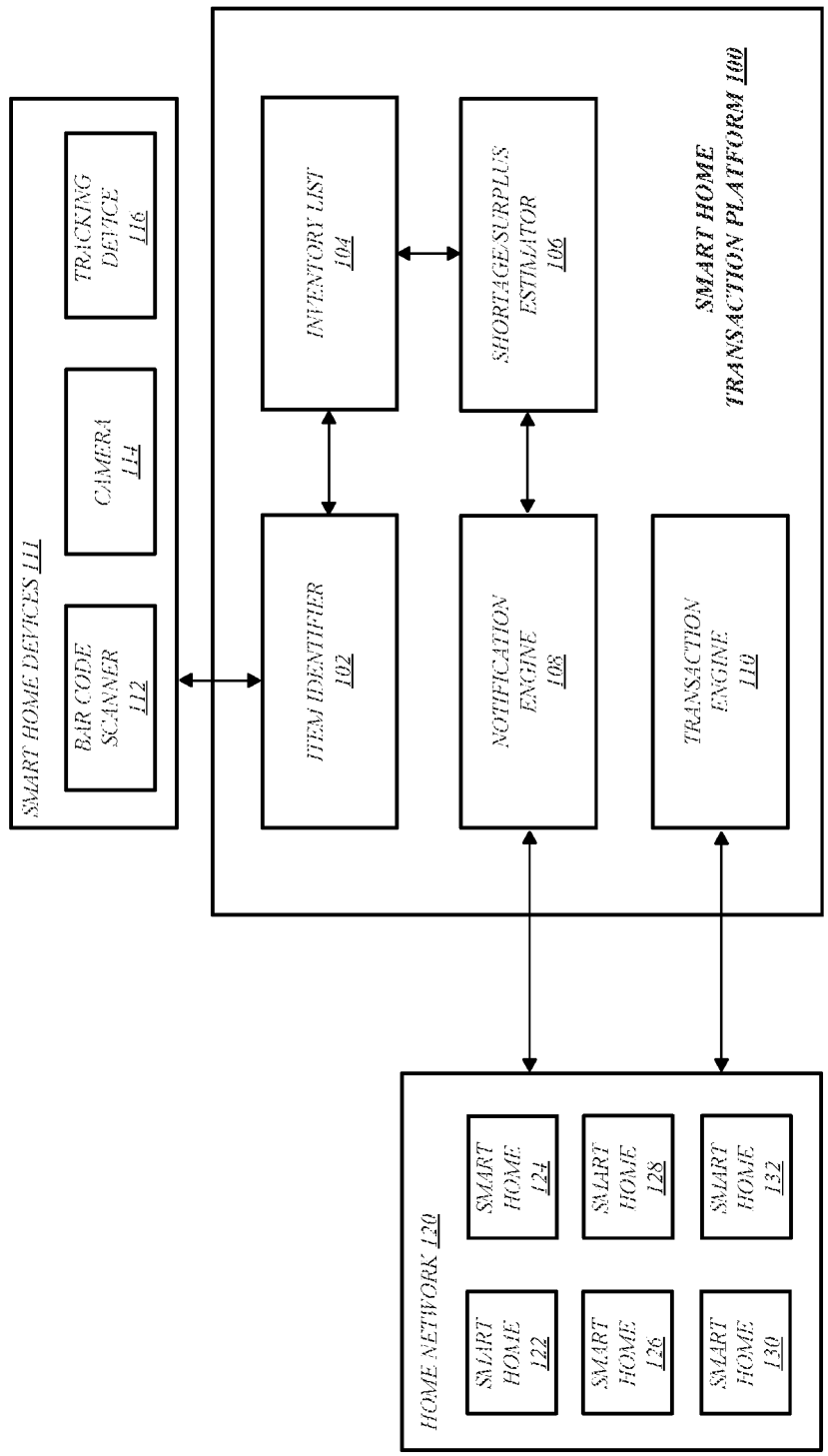
FIG. 1 illustrates an example smart home transaction platform in accordance with one or more embodiments.

Various embodiments are generally directed to a system for facilitating transactions among smart homes of a hyperlocal marketplace. In examples, a smart home system may track one or more purchased items, e.g., via a bar code scanner, a camera, a tracking device, etc. The purchased items, for instance, may be perishable goods, such as grocery items. The smart home system may maintain a running inventory of all the purchased items and the smart home system may determine whether there will be a shortage or a surplus for each item prior to predefined time period, e.g., the next time the items will be replaced or replenished. Based on this determination, the smart home system may notify other smart homes in the hyperlocal marketplace that (i) there is a surplus of certain items (or portions thereof) for sale and/or (ii) that there will be a shortage of certain items. The smart home system may then sell the surplus items and/or purchase the shortage items from other smart homes in the hyperlocal marketplace.

According to embodiments, the inventory maintained by the smart home system may include various information related to the one or more purchased items. For example, the inventory may include the name of the item, quantity of the item, expiration date, last purchase date of the item, the next expected repurchase date, purchase date, or replenishment date, average rate of usage or consumption, etc. As will be described below, shortage or surplus determinations may be based on at least the average consumption rate of an item in relation to the last purchase date and the next expected purchase date (or in some instances, the expiration date, when the expiration date occurs prior to the next purchase date). In examples, the average consumption rate or usage rate may be calculated using various data points over a predetermined period of time.

According to examples, the smart home system may place bids on items offered for sale by other smart home systems in the hyperlocal marketplace. For instance, the bids may be dynamically adjusted based on funds available in a bank account and/or based on a predetermined event, such as payday. Thus, days immediately following payday, bids may be increased more than normal, or days immediately prior to payday, bids may be decreased more than normal since funds may be low at that particular time.

In examples, the hyperlocal marketplace may include a plurality of smart homes clustered in one or more neighborhoods. A smart home located in one neighborhood may transact with a smart home located in a different neighborhood. Or two or more smart homes located in the same neighborhood may transact among each other.

In prior solutions, waste related to perishable goods were primarily managed by the grocery stores. There are no systems or mechanisms in place to reduce waste on the consumer side. The embodiments and examples described herein overcome, improve upon, and are advantageous over the previous solutions in numerous ways. For example, by allowing smart home systems to interact among each other and make known various shortage or surplus items, the smart home systems may reduce waste of perishable goods by redistributing the items among the homes that need them. Moreover, the identifying, tracking, maintaining, selling, buying, etc. of the various items in a given smart home can be partially or entirely automated.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example smart home transaction platform 100 according to embodiments. As shown, the smart home transaction may include at least an item identifier 102, an inventory list 104, a shortage/surplus estimator 106, a notification engine 108, and a transaction engine 110. It may be understood that one or more of the aforementioned components of the smart home transaction platform 102 may be arranged or configured outside of the platform 102.

The item identifier 102 may be operatively coupled to one or more smart home devices 111, such as bar code scanner 112, a camera 114, and a tracking device 116 (e.g., infrared, laser, etc.), which may be used to identify and track any purchased item that may enter and be kept in a smart home. In some examples, it may be understood that the home transaction platform 100 may receive information from other sources, e.g., grocery shopping application on user's mobile device (e.g., the smart homeowner's smartphone), mobile banking application, etc., related to recently purchased items.

Information relating to the purchased items may be maintained in an inventory or inventory list 104, which will be further described below. For instance, it may contain quantity information, rate of consumption or usage, anticipated replacement or replenish timeframes, etc. in order to determine whether there will be a predicted shortage or predicted surplus of each item. The shortage/surplus estimator 106 may perform such determination. In some examples, the predicted shortage and/or predicted surplus may be determined via machine learning and/or an artificial neural network.

Upon determining that there is a shortage or a surplus of at least one item, the notification engine 108 may send notification messages to or otherwise notify one or more smart homes (e.g., at least a different notification engine) via a home network 120. Collectively, the one or more smart homes, e.g., smart homes 122, 124, 126, 128, 130, and 132 may form a hyperlocal marketplace. For example, in the event of a shortage, the notification messages may specify at least the shortage item(s) and the shortage amount. Via the transaction engine 110, bids may be placed on items made available for sale by the one or more smart homes in the hyperlocal marketplace via the home network 120. When there is a surplus, the notification message may specify at least the surplus items(s) and the surplus amount. Via the transaction engine 110, the item of surplus (or portions thereof) may be sold to the one or more smart homes in the hyperlocal marketplace.

FIG. 2 illustrates an example inventory list 200 according to embodiments. As shown, the inventory list may include at least seven different columns, each revealing relevant and important information related to shortage and surplus estimations. For example, the inventory list may include information indicating the name of the item, quantity, last date of purchase of the item, average usage or consumption rate, the next expected date of purchase or replenishment, expiration date, and whether there will likely be a shortage or surplus of the item.

As shown, the inventory list 200 may include at least the following items: bread 202, eggs, 204, milk 206, flour 208, sugar 210, berries 212, salmon 214, chicken 216, carrots 218, and ibuprofen 220. The purchased items may have been identified or tracked by the smart home system devices, described above, such as the bar code scanner, the camera, and the tracker. In examples, the devices may be arranged or configured around, near, or in areas where the items are stored, e.g., refrigerator, freezer, pantry, etc. Moreover, it may be understood that items may be perishable goods and may include meat, meat by-products, fish, seafood, dairy products, fruits, vegetables, flowers, over-the-counter pharmaceutical products, etc.

As described above, other types of information relevant to the shortage or surplus determinations of each item may also be included in the inventory list 200. For example, there may be 48 slices (quantity) of bread, which was last purchases on Jan. 1, 2019, where four slices are consumed per day on an average basis. The next expected date of purchase or replenishment is Jan. 15, 2019, which is 14 days from the date of purchase. Thus, a smart home system via a smart home transaction platform, e.g., smart home transaction platform 100, may calculate or determine that there will likely be a shortage of bread prior to the next purchase date (14 days from the last purchase date) since the average usage rate of four slices per day equates to 12 days until consumption of the 48 total slices. The predicted shortage may also be determined on the basis that it is unlikely that more bread will be purchased prior to the next purchase date. It may be understood that the next purchase date or event may be dynamically determined based on an analysis of past purchase events and trends/patterns thereof.

It may be understood that the shortage or surplus determinations may be based on at least three pieces of information—the last date of purchase, the average usage or consumption rate, and a predefined date, e.g., the earlier of the next expected date of purchase or replenishment, expiration date, etc. Thus, in the bread 202 example above, had the expiration date fallen prior to the next expected purchase date, then that would be the date used to calculate shortage or surplus.

Similarly, in another example, two gallons of milk purchased on Dec. 23, 2019 may be consumed 0.2 gallon per day on an average basis, which calculates to 10 days until full consumption. Because the next expected date of purchase or replenishment is 23 days from the last date of purchase, there will be a shortage of milk for 13 days. In yet another example, 36 eggs may have been purchased on Jan. 3, 2019 and there may be a 2 egg per day average usage rate, which means that by the next expected purchase date there will likely be a surplus of 12 eggs.

In a further example, two pounds of salmon may have been purchased on Jan. 9, 2019, which has an average usage rate of zero pounds per day on an average basis. The user may have forgotten that salmon was purchased, and thus, is not being consumed. Accordingly, there will likely be a two-pound surplus of the salmon. In another example, 12 ounces of berries may have been purchased on the same day, Jan. 9, 2019, having an average usage or consumption rate of two ounces per day. Since the next expected date of purchase is Jan. 15, 2019, which is six days from the date of purchase, there will neither be a shortage nor surplus of the berries.

Moreover, it may be understood that the average usage rate or consumption rate may be determined based on a predetermined range of data points. For example, the consumption rate of a particular item may be observed and averaged for a period of two weeks, a month, two months, etc. It may also be understood that the expiration date may be the date set by the grocery store or the item manufacturer, or it may be customizable and/or set by the user.

FIG. 3 illustrate example notifications 300 according to embodiments. For ease of explanation, the purchased items and associated information shown in FIG. 2 will be used to describe the notifications illustrated in FIG. 3. As shown, a shortage notification 302 and/or a surplus notification 304 may be transmitted or broadcasted to one or more smart homes of a hyperlocal marketplace via a home network. For example, the notifications 300 may the notification messages that the notification engine 108 of the smart home transaction platform 100 of FIG. 1 may send to the smart homes 122-132 via home network 120.

In examples, the shortage notification 302 may include a list of shortage items and the quantity of those items. From FIG. 2, the shortage items include eight slices of bread, 2.6 gallons of milk, and two pounds of chicken. A smart home system may broadcast the shortage notification 302 to the one or more smart homes of the hyperlocal marketplace. Upon receiving the shortage notification 302, the smart home system may receive notification(s) from the hyperlocal marketplace that various shortage items (if available) are on sale.

As further shown, the surplus notification 304 may include a list of surplus items and the quantity thereof. For example, from FIG. 2, the surplus items may include at least 12 eggs, 2.75 pounds of flour, 1.75 pounds of sugar, two pounds of salmon, half a pound of carrots, and 8 counts of Ibuprofen. Similar to the shortage notification 302, the smart home system may broadcast the surplus notification 304 to the one or more smart homes of the hyperlocal marketplace and receive offers or bids to purchase those surplus items. Surplus items that are expired or otherwise unsafe to sell to the hyperlocal marketplace may be excluded from surplus notifications.

It may be understood that multiple notifications may be sent or broadcasted over a period of time. Moreover, it may be understood that both the shortage and surplus notifications may be combined in one message and subsequently sent or broadcasted to the one or more smart homes of the hyperlocal marketplace.

FIG. 4A illustrates an example smart home transaction according to embodiments. As shown, a smart home system may receive an availability notification 402, which includes one or more items (or portions thereof) that are for sale by one or more smart homes in a hyperlocal marketplace. For example, in response to the shortage notification 302 of FIG. 3, the availability notification may indicate that smart home 404 has six eggs to sell, the bidding for which starts at five cents per egg, and that smart home 406 also has six eggs to sell, the bidding starting at seven cents per egg. Moreover, the availability notification 402 indicates that two gallons of milk are available for sale at smart home 408 at $1.25 per gallon and that smart home 410 is selling a gallon of milk at $1.75 per gallon. And smart home 412 may be selling three pounds of chicken at two dollars per pound.

In response, the smart home system may submit bids for purchasing the items included in the availability notification 402. For example, bid 420 may be a bid for the six eggs being offered by smart home 404 at seven cents per egg, which is two cents more than the starting bid. Bid 422 may be a bid for the six eggs being offered by smart home 406 at nine cents per egg, which is again two cents more than the starting bid. Bid 424 may be a bid for two gallons of milk being offered by smart home 408 at $1.50 per gallon, which is 25 cents more than the starting bid. Additionally, bid 426 may be bid for the two pounds of chicken being offered by smart home 412 at $2.50 per pound, which is 50 cents more than the starting bid.

In examples, the bids may be submitted based on available funds in a banking account. When funds are low, the bids may be dynamically determined or adjusted to maximize the available funds. When funds are high, the bids may be set higher to ensure that the desired items are obtained. In other examples, the bids may be dynamically adjusted based on a predetermined event, e.g., payday, where the bid may be dynamically increased a predefined number of days after the payday and/or the bid may be dynamically decreased or may be set so that the bid does not exceed a threshold amount when it is a predefined number of days, e.g., three days, two days, one day, prior to the payday.

FIG. 4B illustrates another example smart home transaction according to embodiments. As shown, bids on surplus items may be received by a smart home system. For example, bid 430 is from smart home 414 requesting six eggs at 10 cents each, bid 432 is from smart home 432 requesting two pounds of salmon at $3.50 per pound, and bid 434 is from smart home 418 requesting half a pound of carrots at a dollar per pound. The smart home system via one or more computing devices may determine whether one or more of the bids 430, 432, 434 meets at least one criterion, e.g., received bid is above a price threshold, bid must request the item (or portion thereof) in its entirety, the requesting smart home is a predetermined threshold distance away, etc. Based on a determination that the smart home system can accept a bid, e.g., the specified quantity and item is confirmed to be available, the bid may be accepted, and the item may then be delivered (or picked up).

Figure 5:
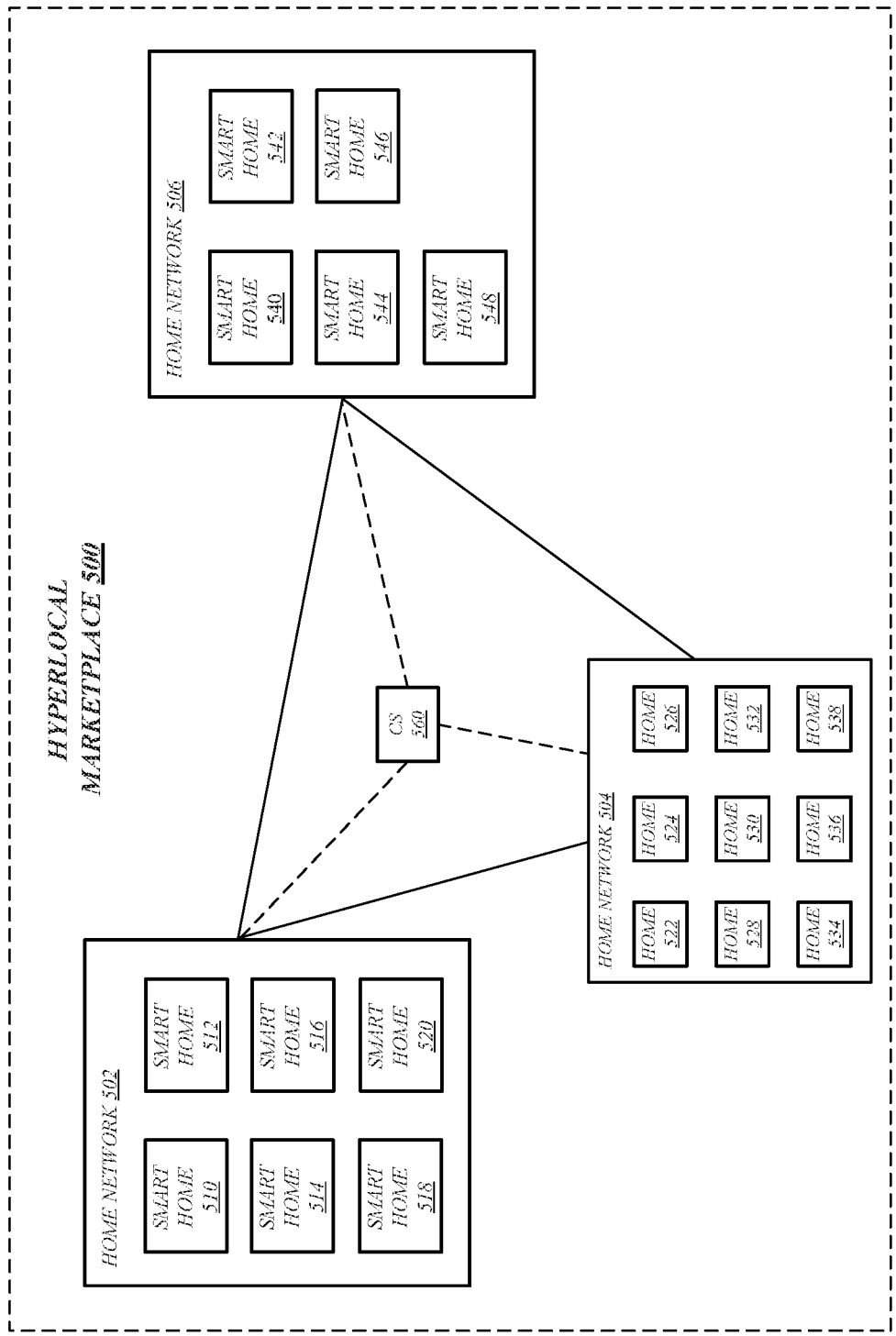
FIG. 5 illustrates an example hyperlocal marketplace in accordance with one or more embodiments.

FIG. 5 illustrates an example hyperlocal marketplace 500 according to embodiments. As shown, home networks 502, 504, and 506 are interconnected as part of the hyperlocal marketplace 500 and may communicate with each other. Each home network may interconnect two or more smart homes. For example, home network 502 interconnects and facilitates the communication among smart homes 510, 512, 514, 516, 518, and 520. Similarly, home network 504 interconnects and allows the communication among smart homes 522, 524, 526, 528, 530, 532, 534, 536, and 538. And home network 506 interconnects and provides communication among homes 540, 542, 544, 546, and 548. At least one computing device of a smart home system may be located at a first smart home (e.g., smart home 510) and may communicate with at least one computing device of a second smart home system located at a second smart home (e.g., smart home 540).

Moreover, each home network may represent a neighborhood, where the neighborhoods are adjacent to each other. In examples, the hyperlocal marketplace 500 may be geographically limited in size, e.g., by zip code, by predefined boundary lines, by community, etc. As shown, the communications among the home networks 502, 504, and 506 may be decentralized, or in some examples, at least one central server (CS) computer 560 may facilitate the communications. For instance, the at least one central server computer 560 may be provisioned in the cloud.

Figure 6:
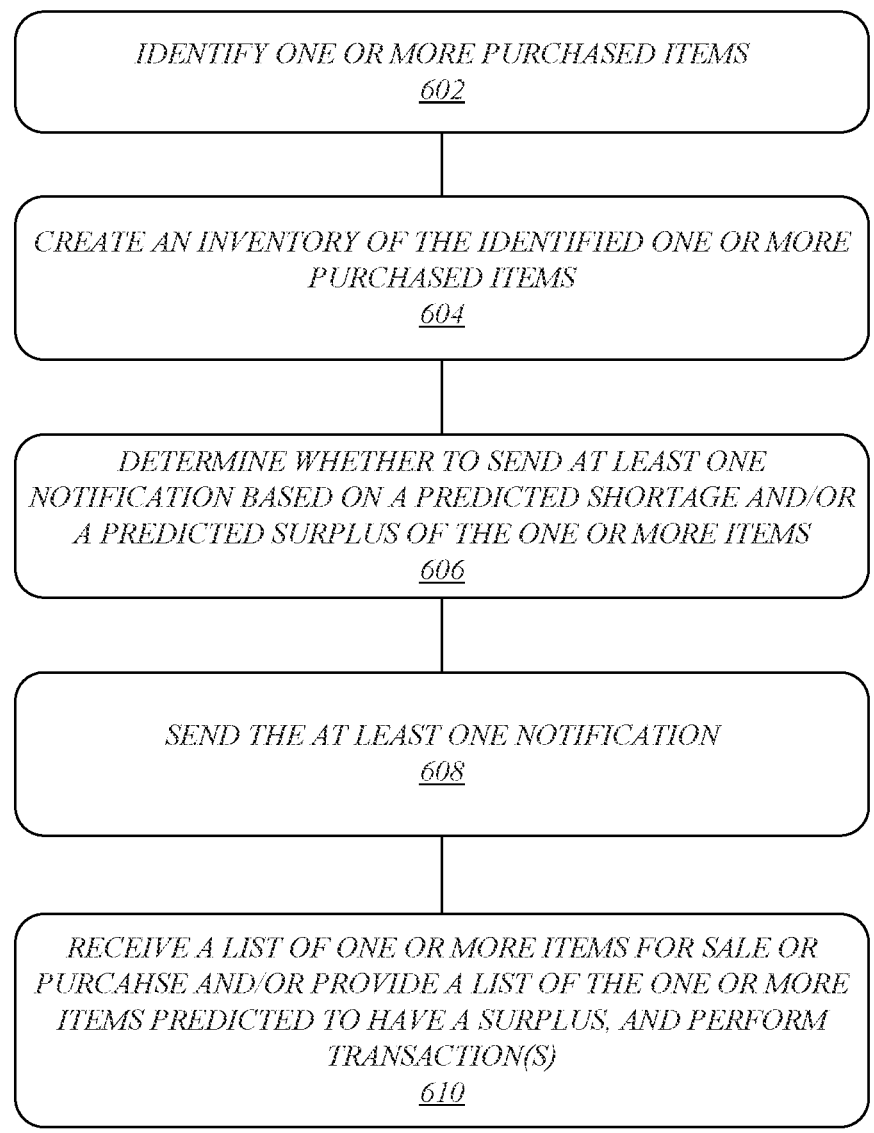
FIG. 6 illustrates an example flow diagram in accordance with one or more embodiments.

FIG. 6 illustrates an example flow diagram 600 according to one or more embodiments. It may be understood that the features associated with the illustrated blocks may be performed or executed by one or more computing devices and/or processing circuitry contained therein that can run, support, execute a smart home system or a smart home transaction platform, such as the one illustrated in FIG. 1.

At block 602, one or more purchased items are identified by the smart home system or the smart home transaction platform. For example, the purchased items may have been identified or tracked by the smart home system devices, described above, such as a bar code scanner, a camera, and a tracker (e.g., thermal imaging, etc.). The devices may be arranged or configured around, near, or in areas where the items are stored, e.g., refrigerator, freezer, pantry, etc. It may be understood that the devices used to identify or track the purchased items are not limited to just smart home devices but may also include any other suitable types of devices.

At block 604, an inventory or inventory list of the identified one or more purchased items may be created. For instance, the inventory list may contain quantity information, rate of consumption or usage, anticipated replacement or replenish timeframes, etc. in order to determine whether there will be a predicted shortage or predicted surplus of each item at block 606. As described above, the calculations of the predicted shortages or surpluses may be based on specific events, such as the next replenishment date (e.g., the next expected grocery shopping date or purchase date of the item), how much funds are available in the user's banking accounts (e.g., less funds available when approaching pay day, more funds available the days immediately following pay day), expiration dates corresponding to each item (if any), average usage rates of each item, etc. Thus, for instance, if there will be leftover chicken prior to the next expected purchase date based on the average usage rate of the chicken, then there will be a surplus of the chicken.

At block 608, a surplus notification and/or a shortage notification is sent to other smart homes in the area via a smart home network. In examples, the smart homes connected to that smart home network may be considered the hyperlocal marketplace. For instance, the surplus notification may include one or more of the expected surplus items along with the expected surplus quantity. Similarly, the shortage notification may include one or more of the expected shortage items along with the expected shortage quantity. The surplus and/or shortage notifications may be sent via a messaging interface on the smart home transaction platform, or in some examples, the smart home may automatically generate and transmit these messages to the other smart homes in the smart home network.

At block 610, in response to the shortage notification, a list of one or more items for sale or purchase (which may also be referred to as an availability notification, as described above) may be received from the other smart homes. For instance, the availability notification may contain the type and quantity of the shortage item for sale, the identification of the smart home offering the shortage item for sale, and/or the price at which bidding will start for that item. It may be understood that individual availability notifications may be received for each item being offered for sale, or in some instances, all of the items for sale may be included in one availability notification. Upon receiving the availability notification, the smart home transaction platform may automatically bid on each item. The bidding process may be dynamic, e.g., the bidding amounts may be based on available funds in the user's banking account(s), need or priority of the item, etc.

Moreover, or optionally, at block 610, in response to shortage notification(s) received from other smart homes in the smart home network, a list of expected surplus items available for purchase may be sent to those homes. One or more bids associated with the expected surplus items are received. The smart home transaction platform may automatically and dynamically accept offers based on various factors, e.g., price, the proximity of the bidding home, requested delivery date, etc. Alternatively, the one or more bids may be automatically received based on the surplus notification(s) sent out at block 608 without having to respond shortage notifications received from the other smart homes. In examples, delivery of the items may be made via any suitable method, e.g., by the user, by courier, by a delivery service, by a secure drop-off-pick-up system, etc.

It may be understood that the blocks illustrated in FIG. 6 are not limited to any specific order. One or more of the blocks may be performed or executed simultaneously or near simultaneously.

Figure 7:
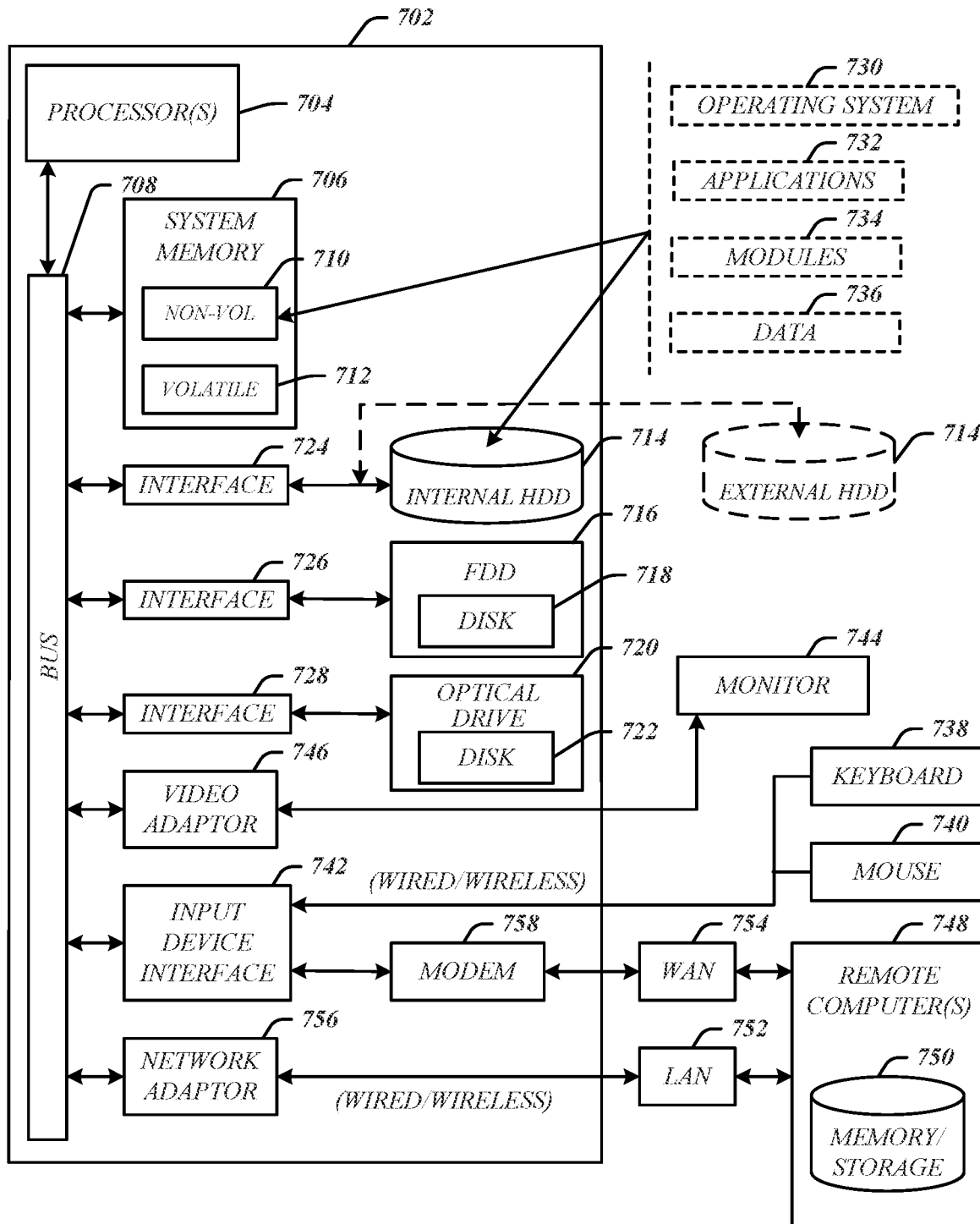
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. In examples, one or more computing devices and the processing circuitries thereof may be configured to at least run, execute, support, or provide a smart home system, e.g., smart home transaction platform 100, and related functionalities.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, a field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
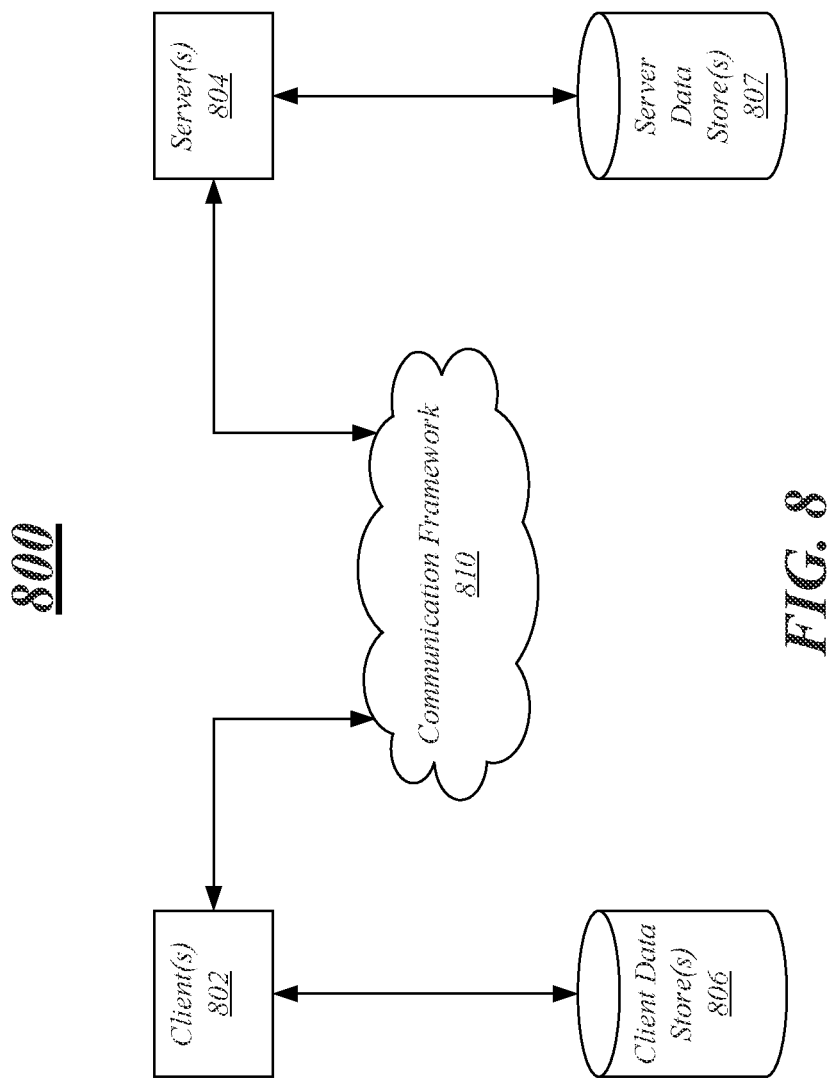
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least a first computing device connected to the network may be one or more computers associated with a first smart home system (e.g., a first smart home transaction platform). At least a second computing device connected to the network may be one or more computers associated with a second smart home system (e.g., a second smart home transaction platform).

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
    one or more processors operable to execute stored instructions that, when executed by the one or more processors, cause the one or more processors to:
        determine whether to send a notification based at least in part on a predicted quantity of one or more items, the predicted quantity comprising a predicted surplus;
        broadcast, via a network, the notification comprising a surplus notification providing a list of surplus items;
        receive, in response to the surplus notification, information related to the one or more items, the information comprising at least one incoming bid for an item on the list of surplus items;
    determine the predicted quantity of the one or more items comprises a predicted shortage of at least one shortage item of the one or more items; and
    submit, in response to the predicted shortage, an outgoing bid on the at least one shortage item, wherein the outgoing bid is dynamically determined or adjusted based on a predetermined event.

2. The apparatus of claim 1, wherein, in response to the predicted shortage, the notification comprises a shortage notification providing a list of the at least one shortage items.

3. The apparatus of claim 1, wherein the instructions, when executed by the one or more processors, cause the one or more processors to:
    identify and create an inventory of the one or more items;
    perform a transaction with at least one computing device connected to the network; and
    determine the predicted shortage by:
        determining whether the one or more items will be repurchased or replenished by a time based on a history of one or more purchase events related to the one or more items; and
        determining the predicted shortage based on the determination that the one or more items will not be repurchased or replenished by the time.

4. The apparatus of claim 1, wherein the instructions, when executed by the one or more processors, cause the one or more processors to:
    determine the predicted surplus by:
        determining whether the one or more items will be repurchased or replenished prior to a time based on a history of one or more purchase events related to the one or more items; and
        determining the predicted surplus based on the determination that the one or more items will be repurchased or replenished by the time.

5. The apparatus of claim 3, wherein the instructions, when executed by the one or more processors, cause the one or more processors to:
    perform the transaction by:
        determining whether the at least one incoming bid meets at least one criterion; and accepting one bid of the at least one incoming bid based on the determination that the one bid of the at least one incoming bid meets the at least one criterion.

6. The apparatus of claim 1, wherein the predicted shortage or the predicted surplus of the one or more items is determined via a machine learning algorithm or an artificial neural network.

7. The apparatus of claim 1, wherein the predetermined event comprises at least one of available funds in an account or a payday event.

8. A method comprising:
determining, via at least one processor, whether to send a notification based at least in part on a predicted quantity of one or more items, the predicted quantity comprising a predicted surplus;
broadcasting, via a network, the notification comprising a surplus notification providing a list of surplus items;
receiving, in response to the surplus notification, information related to the one or more items, the information comprising at least one incoming bid for an item on the list of surplus items;
determining the predicted quantity of the one or more items comprises a predicted shortage of at least one shortage item of the one or more items; and
submitting, in response to the predicted shortage, an outgoing bid on the at least one shortage item based on available funds in an account, wherein the outgoing bid is dynamically determined or adjusted based on a predetermined event.

9. The method of claim 8, wherein, in response to the predicted shortage, the notification comprises a shortage notification providing a list of the at least one shortage items.

10. The method of claim 8, further comprising:
identifying and creating an inventory of the one or more items;
performing a transaction with at least one computing device connected to the network; and
determining the predicted shortage by:
determining whether the one or more items will be repurchased or replenished by a time based on a history of one or more purchase events related to the one or more items; and
determining the predicted shortage based on the determination that the one or more items will not be repurchased or replenished by the time.

11. The method of claim 8, further comprising determining the predicted surplus by:
determining whether the one or more items will be repurchased or replenished prior to a time based on a history of one or more purchase events related to the one or more items; and
determining the predicted surplus based on the determination that the one or more items will be repurchased or replenished by the time.

12. The method of claim 10, wherein performing the transaction further comprises:
determining whether the at least one incoming bid meets at least one criterion; and
accepting one bid of the at least one incoming bid based on the determination that the one bid of the at least one incoming bid meets the at least one criterion.

13. The method of claim 8, wherein the predetermined event comprises at least one of available funds in an account or a payday event.

14. At least one non-transitory computer-readable storage medium storing computer-readable program code executable by at least one processor to:
determine whether to send a notification based at least in part on a predicted quantity of one or more items, the predicted quantity comprising a predicted surplus;
broadcast, via a network, the notification comprising a surplus notification providing a list of surplus items;
receive, in response to the surplus notification, information related to the one or more items, the information comprising at least one incoming bid for an item on the list of surplus items;
determine the predicted quantity of the one or more items comprises a predicted shortage of at least one shortage item of the one or more items; and
submit, in response to the predicted shortage, an outgoing bid on the at least one shortage item based on available funds in an account, wherein the outgoing bid is dynamically determined or adjusted based on a predetermined event.

15. The at least one non-transitory computer-readable storage medium of claim 14, wherein, in response to the predicted shortage, the notification comprises a shortage notification providing a list of the at least one shortage items.

16. The at least one non-transitory computer-readable storage medium of claim 14, wherein the computer-readable program code further causes the at least one processor to:
identify and create an inventory of the one or more items; and
perform a transaction with at least one computing device connected to the network; and
determine the predicted shortage comprises the computer-readable program code by:
determining whether the one or more items will be repurchased or replenished by a time based on a history of one or more purchase events related to the one or more items; and
determining the predicted shortage based on the determination that the one or more items will not be repurchased or replenished by the time.

17. The at least one non-transitory computer-readable storage medium of claim 14, wherein the computer-readable program code further causes the at least one processor to:
determine the predicted surplus by:
determining whether the one or more items will be repurchased or replenished prior to a time based on a history of one or more purchase events related to the one or more items; and
determining the predicted surplus based on the determination that the one or more items will be repurchased or replenished by the time.

18. The at least one non-transitory computer-readable storage medium of claim 16, wherein the performed transaction comprises the computer-readable program code further causing the at least one processor to:
determine whether the at least one incoming bid meets at least one criterion; and
accept one bid of the at least one incoming bid based on the determination that the one bid of the at least one incoming bid meets the at least one criterion.

19. The at least one non-transitory computer-readable storage medium of claim 14, wherein the predicted shortage or the predicted surplus of the one or more items is determined via a machine learning algorithm or an artificial neural network.

20. The at least one non-transitory computer-readable storage medium of claim 14, wherein the predetermined event comprises at least one of available funds in an account or a payday event.

* * * * *